(12) United States Patent
Subbarao (10) Patent No.: US 10,769,062 B2
(45) Date of Patent: Sep. 8, 2020

(54) FINE GRANULARITY TRANSLATION LAYER FOR DATA STORAGE DEVICES

(71) Applicant: Western Digital Technologies, Inc., San Jose, CA (US)

(72) Inventor: Sanjay Subbarao, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/246,401

(22) Filed: Jan. 11, 2019

(65) Prior Publication Data

US 2020/0104252 A1 Apr. 2, 2020

Related U.S. Application Data

(60) Provisional application No. 62/739,601, filed on Oct. 1, 2018.

(51) Int. Cl.
*G06F 12/02* (2006.01)
*G06F 12/1027* (2016.01)
*G06F 9/50* (2006.01)

(52) U.S. Cl.
CPC ........ *G06F 12/0246* (2013.01); *G06F 9/5016* (2013.01); *G06F 9/5077* (2013.01); *G06F 12/1027* (2013.01); *G06F 2212/7201* (2013.01)

(58) Field of Classification Search
CPC .................................................. G06F 3/0641
See application file for complete search history.

(56) References Cited

U.S. PATENT DOCUMENTS

| | | | |
|---|---|---|---|
| 4,420,807 A | 12/1983 | Nolta et al. | |
| 5,608,876 A | 3/1997 | Cohen et al. | |
| 6,856,556 B1 | 2/2005 | Hajeck | |
| 7,023,726 B1 | 4/2006 | Chen et al. | |
| 7,126,857 B2 | 10/2006 | Hajeck | |
| 7,216,211 B2 | 5/2007 | Munguia et al. | |
| 7,386,655 B2 | 6/2008 | Gorobets et al. | |
| 7,430,136 B2 | 9/2008 | Merry, Jr. et al. | |
| 7,447,807 B1 | 11/2008 | Merry et al. | |

(Continued)

FOREIGN PATENT DOCUMENTS

WO 2012134641 A2 10/2012

OTHER PUBLICATIONS

Pending U.S. Appl. No. 16/246,425, filed Jan. 11, 2019, entitled "Container Key Value Store For Data Storage Devices", Sanjay Subbarao.

(Continued)

*Primary Examiner* — Edward J Dudek, Jr.
(74) *Attorney, Agent, or Firm* — Barry IP Law, P.C.

(57) ABSTRACT

A Data Storage Device (DSD) includes a non-volatile memory configured to store data, and control circuitry configured to receive a memory access command from a host to access data in the non-volatile memory. A location is identified in the non-volatile memory for performing the memory access command using an Address Translation Layer (ATL) that has a finer logical-to-physical granularity than a logical-to-physical granularity of a logical block-based file system executed by the host or a granularity based on a memory Input/Output (IO) transaction size of a processor of the host. The non-volatile memory is accessed at the identified location to perform the memory access command.

21 Claims, 9 Drawing Sheets

---

Receive Memory Access Command From Host To Access Data In Non-Volatile Memory. — 502

Identify Location In Non-Volatile Memory For Performing Memory Access Command Using ATL That Has A Finer Granularity Than A L2P Granularity Of A Logical Block-Based File System Executed By Host And/or A Granularity Based On A Memory I/O Transaction Size Of A Host Processor — 504

Access Non-Volatile Memory At Identified Location To Perform Memory Access Command — 506

(56) References Cited

U.S. PATENT DOCUMENTS

| | | |
|---|---|---|
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,904,619 B2 | 3/2011 | Danilak |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,979,601 B2 | 7/2011 | Berenbaum et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | DeForest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, I et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,631,191 B2 | 1/2014 | Hashimoto |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,392 B1 | 5/2014 | Asnaashari et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,903,995 B1 | 12/2014 | Basak et al. |
| 8,947,803 B1 | 2/2015 | Yamakawa et al. |
| 9,116,800 B2 | 8/2015 | Post et al. |
| 9,189,387 B1 | 11/2015 | Taylor et al. |
| 9,342,453 B2 | 5/2016 | Nale et al. |
| 9,619,174 B2 | 4/2017 | Chen et al. |
| 9,836,404 B2 | 12/2017 | Ummadi et al. |
| 9,857,995 B1 | 1/2018 | Malina et al. |
| 10,126,981 B1 | 11/2018 | Malina et al. |
| 10,423,536 B2 | 9/2019 | Noguchi et al. |
| 10,482,009 B1* | 11/2019 | Sabol .................. G06F 12/0246 |
| 10,496,544 B2 | 12/2019 | Wang et al. |
| 2010/0037002 A1 | 2/2010 | Bennett |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0166891 A1 | 6/2012 | Dahlen et al. |
| 2012/0210068 A1 | 8/2012 | Joshi et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0317377 A1* | 12/2012 | Palay .................. G06F 12/0246 |
| | | 711/154 |
| 2012/0324191 A1 | 12/2012 | Strange et al. |
| 2012/0331016 A1 | 12/2012 | Janson et al. |
| 2013/0080687 A1 | 3/2013 | Nemazie et al. |
| 2013/0091321 A1 | 4/2013 | Nishtala et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0108703 A1* | 4/2014 | Cohen .................. G06F 3/0616 |
| | | 711/103 |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2014/0226389 A1* | 8/2014 | Ebsen .................. G06F 16/9014 |
| | | 365/148 |
| 2014/0351515 A1 | 11/2014 | Chiu et al. |
| 2015/0058534 A1 | 2/2015 | Lin |
| 2015/0142996 A1 | 5/2015 | Lu |
| 2015/0302903 A1 | 10/2015 | Chaurasia et al. |
| 2015/0363320 A1 | 12/2015 | Kumar et al. |
| 2016/0027481 A1* | 1/2016 | Hong .................. G06F 12/0246 |
| | | 714/807 |
| 2016/0118130 A1 | 4/2016 | Chadha et al. |
| 2016/0313943 A1 | 10/2016 | Hashimoto et al. |
| 2016/0342357 A1 | 11/2016 | Ramamoorthy et al. |
| 2016/0357463 A1 | 12/2016 | DeNeui et al. |
| 2017/0024332 A1 | 1/2017 | Rui et al. |
| 2017/0147499 A1* | 5/2017 | Mohan .................. G06F 3/0616 |
| 2017/0160987 A1 | 6/2017 | Royer, Jr. et al. |
| 2017/0286291 A1* | 10/2017 | Thomas .............. G06F 12/0253 |
| 2018/0095898 A1 | 4/2018 | Khosravi et al. |
| 2019/0188153 A1 | 6/2019 | Benisty et al. |

OTHER PUBLICATIONS

Phil Mills, "Storage Class Memory—the Future of Solid State Storage,"http://www.snia.org/sites/default/education/tutorials/2009/fall/solid/PhilMills_The_Future_of_Solid_State_Storage.pdf., SNIA Education, 2009.

Pending U.S. Appl. No. 16/176,997, filed Oct. 31, 2018, entitled "Tiered Storage Using Storage Class Memory", James N. Malina.

Pending U.S. Appl. No. 16/683,095, filed Nov. 13, 2019, entitled "Storage Class Memory Access", Manzanares et al.

Kang et al.; "Subpage-based Flash Translation Layer for Solid State Drivers"; Jan. 2006; 10 pages; available at: https://cs.kaist.ac.kr/fileDownload?kind=tech&sn=340.

(56) References Cited

OTHER PUBLICATIONS

Kim et al.; "Partial Page Buffering for Consumer Devices with Flash Storage"; Proceedings 2013 IEEE 3rd International Conference on Consumer Electronics—Berlin, ICCE-Berlin 2013 (pp. 177-180); available at: https://hanyang.elsevierpure.com/en/publications/partial-page-buffering-for-consumer-devices-with-flash-storage.

Wu et al.; "Delta-FTL: Improving SSD Lifetime via Exploiting Content Locality"; Apr. 10-13, 2012; 13 pages; available at: https://cis.temple.edu/~he/publications/Conferences/DeltaFTL-Eurosys12.pdf.

Xia et al.; "Edelta: A Word-Enlarging Based Fast Delta Compression Approach"; Jul. 2015; 5 pages; available at: https://www.usenix.org/system/files/conference/hotstorage15/hotstorage15-xia.pdf.

Pending U.S. Appl. No. 16/196,077, filed Nov. 20, 2018, entitled "Data Access in Data Storage Device Including Storage Class Memory", Dubeyko et al.

Hitachi Vantara; "Hitachi Accelerated Flash 2.0"; Sep. 2018; 20 pages; available at: https://www.hitachivantara.com/en-us/pdfd/white-paper/accelerated-flash-whitepaper.pdf.

Pending U.S. Appl. No. 16/867,793, filed May 6, 2020, entitled "Page Modification Encoding and Caching", Cassuto et al.

\* cited by examiner

FINE GRANULARITY TRANSLATION LAYER FOR DATA STORAGE DEVICES

CROSS-REFERENCE TO RELATED APPLICATION

This application claims the benefit of U.S. Provisional Application No. 62/739,601, entitled "FAST NAND AS MAIN MEMORY USING ZONED SMALL GRANULARITY FLASH TRANSLATION LAYER" (Atty. Docket No. WDA-4018P-US), filed on Oct. 1, 2018, which is hereby incorporated by reference in its entirety.

BACKGROUND

There is an increase in demand for Dynamic Random Access Memory (DRAM) or main memory in environments such as data centers for application performance. DRAM can be located directly in a server or shared in networked instances of in-memory database applications such as, for example, Memcached, Redis, and Mcperf.

A recently developed practice in the storage industry is to use a low latency Solid-State Drive (SSD), such as a Non-Volatile Memory express (NVMe) SSD, to extend and/or replace a portion of the main memory or DRAM of a host. For example, an entire storage capacity of an SSD (e.g., 750 GB) can be made visible as virtual memory to a host's Operating System (OS) and at least one application executed by the host (e.g., Memcached, Redis, Apache Spark). In some cases, an NVMe SSD can replace 80% of the DRAM that would otherwise be needed. This can provide a lower overall cost without a significant loss in performance for DRAM intensive operations. The host may then include a smaller DRAM.

A memory pool can include a DRAM with a capacity of 10% to 20% of the total capacity of the NVMe SSD for caching frequently accessed data (i.e., "hot data"). The DRAM and the memory of the NVMe SSD can be shared among multiple servers or hosts. Swapping software such as Intel-Memory Drive Technology (IMDT) can execute at the host, and can work with a Memory Management Unit (MMU) of the CPU to present the entire capacity of the NVMe SSD as virtual memory. The NVMe SSD then appears as a virtual memory block device to a host OS and to one or more applications executing at a host.

As an application accesses the virtual memory, some of the accesses will result in a DRAM hit, meaning that the data for the access has already been cached in the DRAM. Other accesses will result in a DRAM miss, meaning that the data has not already been cached in the DRAM. In the case of a DRAM miss, space is created in the DRAM by evicting or flushing a 4K page to the NVMe SSD and reading the requested data from the NVMe SSD and loading it into the DRAM of the memory pool. The virtual memory mapping is then changed by the swapping software. This process can be referred to as a virtual memory exception or page fault. When a page fault occurs, the application thread that encountered the page fault is suspended while another application thread continues processing. After the page fault has been handled through the loading of the new 4K page into the memory pool's DRAM, the suspended thread is resumed.

Although the latencies associated with such page faults are tolerated by multi-threaded applications, a symmetric or similar read and write performance in terms of read Input/Output Operations Per Second (IOPS) and write IOPS is needed in writing the evicted page to the NVMe SSD and reading the new page into the DRAM of the memory pool. Such performance can be obtained with relatively expensive Storage Class Memories (SCMs), as in the example of Intel's Optane storage device. However, flash memories, such as NAND memories, generally have much lower write performance (e.g., write IOPS) as compared to read performance (e.g., read IOPS), such as a three times lower performance (e.g., IOPS) for random writes than for random reads. The time to perform the page eviction or flush to the NVMe SSD discussed above becomes a limiting factor for handling page faults with such NAND memories. In addition, evicting 4K pages to a NAND memory in an SSD can create numerous write operations that deteriorate the endurance or usable life of the NAND memory.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment Examples

Figure 1:
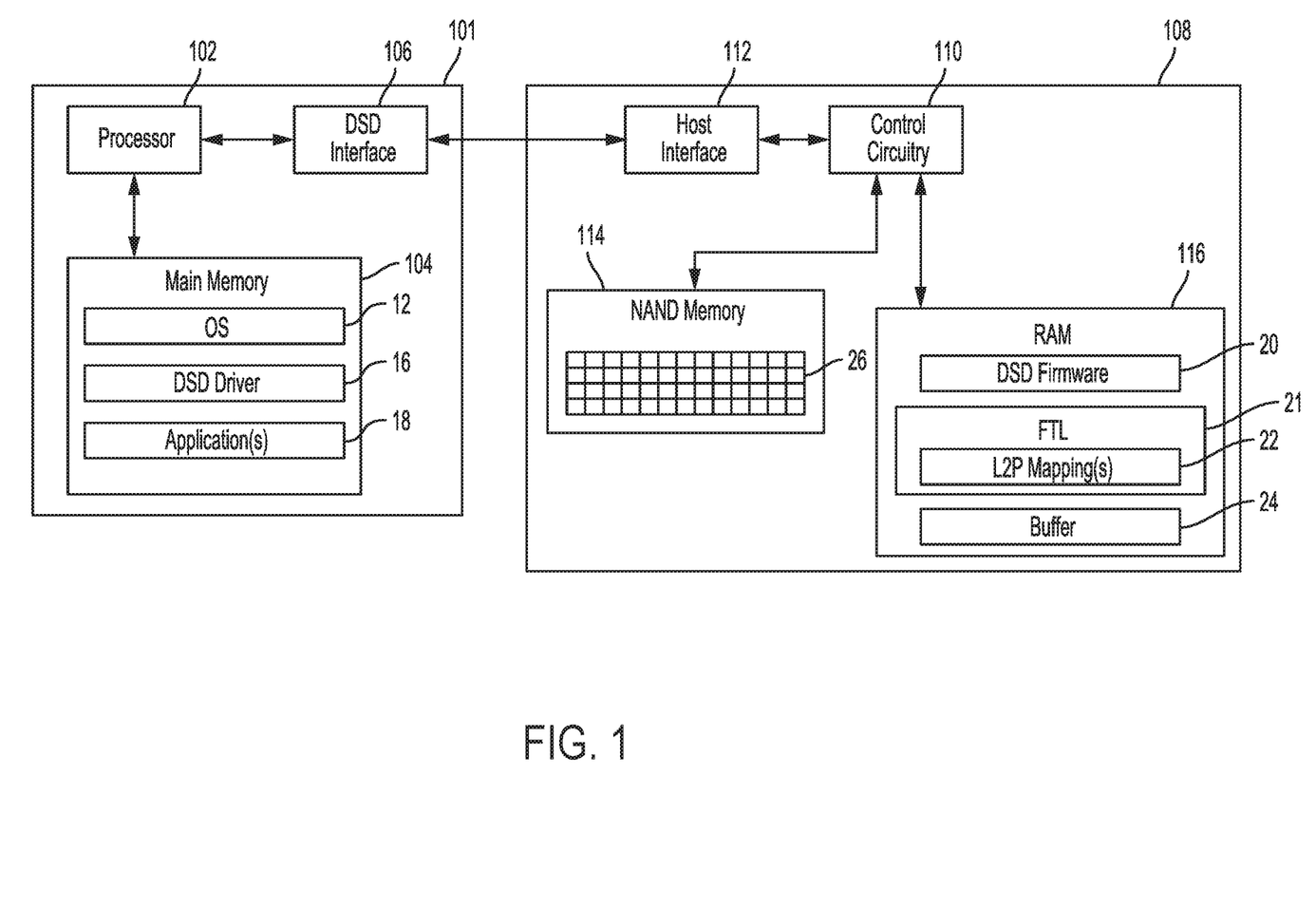
FIG. 1 is a block diagram of a host and a Data Storage Device (DSD) according to an embodiment.

FIG. 1 is a block diagram of host 101 and Data Storage Device (DSD) 108 according to an embodiment. Host 101 communicates with DSD 108 to retrieve data from and store data in DSD 108. In the example of FIG. 1, host 101 is separate from DSD 108, and may include, for example, a client or other computer system. In other embodiments, host 101 may be housed together with DSD 108 as part of a single electronic device, such as, for example, a server, a desktop, laptop or notebook computer or another type of electronic device such as a tablet, smartphone, network media player, portable media player, or Digital Video Recorder (DVR). As used herein, a host can refer to a device that is capable of issuing commands to DSD 108 to store data or retrieve data. In this regard, host 101 may include another DSD such as a smart DSD that is capable of executing applications and communicating with other DSDs.

As shown in FIG. 1, host 101 includes processor 102 for executing instructions, such as instructions from Operating System (OS) 12, DSD driver 16, and/or one or more applications 18. Processor 102 can include circuitry such as a microcontroller, a Digital Signal Processor (DSP), a Central Processing Unit (CPU), an Application-Specific Integrated Circuit (ASIC), a Field Programmable Gate Array (FPGA), hard-wired logic, analog circuitry and/or a combination thereof. In some implementations, processor 102 can include a System on a Chip (SoC), which may be combined with main memory 104.

Main memory 104 can include, for example, a volatile RAM such as Dynamic RAM (DRAM), a non-volatile RAM, a Storage Class Memory (SCM), or other solid-state memory. Main memory 104 can be used by processor 102 to store data used by processor 102. Data stored in main memory 104 can include data read from DSD 108, data to be stored in DSD 108, instructions loaded from an application executed by processor 102, and/or data used in executing such applications.

OS 12 manages resources of host 101, such as main memory 104 and DSD 108. In some implementations, OS 12 creates a byte-addressable, virtual address space for application(s) 18 and other processes executed by processor 102 that maps to locations in main memory 104 for receiving data from DSD 108. Main memory 104 may be used by OS 12 when executing a process or a thread, such as a subset of instructions in a process.

DSD driver 16 provides a software interface to DSD 108 and can include instructions for communicating with DSD 108 in accordance with the processes discussed below. Application(s) 18 can include one or more applications executed by processor 102 that read and/or write data in DSD 108. In some implementations, such as in a data center application where host 101 and DSD 108 are a server or part of a server, application(s) 18 can include a database application, such as Memcached, Redis, and Mcperf.

DSD interface 106 is configured to interface host 101 with DSD 108, and may communicate with DSD 108 using a standard such as, for example, Serial Advanced Technology Attachment (SATA), PCI express (PCIe), Small Computer System Interface (SCSI), Serial Attached SCSI (SAS), Ethernet, Fibre Channel, or WiFi. In this regard, host 101 and DSD 108 may not be physically co-located and may communicate over a network such as a Local Area Network (LAN) or a Wide Area Network (WAN), such as the internet. In addition, DSD interface 106 may also interface with DSD 108 using a logical interface specification such as Non-Volatile Memory express (NVMe) or Advanced Host Controller Interface (AHCI) that may be implemented by DSD driver 16. As will be appreciated by those of ordinary skill in the art, DSD interface 106 can be included as part of processor 102.

As shown in FIG. 1, DSD 108 includes host interface 112, control circuitry 110, NAND memory 114, and RAM 116. Host interface 112 is configured to interface with host 101 and may communicate with host 101 using a standard such as, for example, SATA, PCIe, SCSI, SAS, Ethernet, Fibre Channel, or WiFi. Control circuitry 110 can include circuitry for executing instructions, such as instructions from DSD firmware 20. In this regard, control circuitry 110 can include circuitry such as one or more processors for executing instructions and can include a microcontroller, a DSP, an ASIC, an FPGA, hard-wired logic, analog circuitry and/or a combination thereof. In some implementations, control circuitry 110 can include an SoC, which may be combined with host interface 112, for example.

NAND memory 114 includes pages 26 for storing data of a particular size, such as 4K, 8K, or 16K. Pages 26 represent a smallest writable unit of NAND memory 114. The data stored in pages 26 typically needs to be refreshed or recycled periodically by moving the data from a current block of pages (e.g., 4 MB or 8 MB) to a freshly erased block of pages to maintain the integrity of the data. Although the present disclosure refers to a NAND memory, those of ordinary skill in the art will appreciate that other types of memories may be used in place of a NAND memory, such as other types of logical block-based memories capable of relatively low latency read and write performance (as compared to Hard Disk Drive (HDD) read and write latencies, for example) that may be suitable for replacing more expensive DRAM or SCMs.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

As shown in the example of FIG. 1, DSD 108 includes RAM 116, which can include, for example, a volatile RAM such as DRAM, a non-volatile RAM, SCM, or other solid-state memory. RAM 116 can be used by control circuitry 110 to store data used by control circuitry 110. Data stored in RAM 116 can include data read from NAND memory 114 and data to be stored in NAND memory 114, which can be temporarily stored in buffer 24. In addition, RAM 116 can store instructions loaded from DSD firmware 20 for execution by control circuitry 110, and/or data used in executing DSD firmware 20, such as Logical-to-Physical (L2P) mapping(s) 22 of Flash Translation Layer (FTL) 21.

FTL 21 is a type of address translation layer that may implement several functions for operating NAND memory 114, such as mapping logical addresses for data to physical addresses storing the data (e.g., L2P mapping(s) 22)), wear-leveling to evenly distribute write operations among blocks of pages 26 to prolong a usable life of NAND memory 114, error correction for data read from NAND memory 114, Garbage Collection (GC) to reclaim portions of NAND memory 114 that store invalid or obsolete data, and/or handling defective blocks in NAND memory 114. FTL 21 uses L2P mappings 22, which have a finer granularity than a logical to physical granularity of a logical block-based file system executed by host 101. L2P mapping(s) 22 can instead have a granularity based on a host processor's memory Input/Output (I/O) transaction size (e.g., equal to or a single digit multiple of a cache line size of processor 102, such as 32 Bytes, 64 Bytes, or 128 Bytes), as opposed to a conventional storage I/O transaction size (e.g., based on a 4K, 8K, or 16K page size). In this regard, FTL 21 can be an address translation layer that allocates physical storage units equal to or a single digit multiple of a cache line size of a processor of the host.

DRAM is conventionally used primarily for storing smaller data objects (e.g., less than 100 Bytes), such as data for Key-Value (KV) caches and the metadata of larger data objects stored in the main storage area of a DSD. DRAM workloads are typically dominated by random reads and writes that are equal to or a single digit multiple of a processor cache line size for reads and flushes (e.g., as in L1, L2, or L3 processor caches). For example, these typical I/O transaction sizes for a host processor can be 32 Bytes, 64 Bytes, 128 Bytes, or 512 Bytes. In this regard, Memcached and Redis issue 10 requests in various slab sizes such as 32 Bytes, 64 Bytes, 128 Bytes, or 512 Bytes.

However, as discussed above, caching or paging software typically flushes or evicts data from DRAM at random 4K boundaries instead of flushing or evicting only the data that has changed while loaded in the DRAM. Logical-based file systems executed by hosts conventionally use a logical-to-physical granularity, such as a 4K allocation size, due to historically being aligned to a virtual page size used by a processor of the host.

This can result in a write amplification of 8 to 64 times in a NAND SSD, since the SSD will first invalidate or a full 4K page before the NAND SSD is able to write the evicted page. The portions of the invalidated page that still store valid data are first copied to other areas in the NAND memory before invalidating the page, thereby resulting in write amplification by having to relocate and/or rewrite a large portion of the evicted 4K page when only a relatively small portion (e.g., 64 Bytes) of the evicted page may have changed since the 4K page was previously written in the NAND memory.

An example using Memcached demonstrates the significant amount of write amplification due the relatively small amount of data in evicted 4K pages that has actually been modified by the host. In this example, an average object size of 100 Bytes is used with a load phase for initially loading the object into DRAM, a read phase for accessing the object from DRAM, and a random 70:30 read to write workload for the object. By the time a page is evicted in this example, the probability that three cache lines (e.g., 64 Bytes of data per cache line) of the evicted page are dirty or modified is 77.8%. The probability that six cache lines of the evicted page are dirty is 19.45%, and the probability that nine or more cache lines of the evicted page are dirty is 2.75%.

Accordingly, most of the data in an evicted page in this example is valid data that needs to be rewritten in the NAND memory, thereby increasing write amplification. In this regard, the average sparseness or average amount of data actually accessed in the 4K pages is less than 8.22%. This means that there would be at least a 10× reduction in write amplification in this example if writing to a NAND SSD could be performed at a cache line granularity as opposed to a 4K page size granularity.

As discussed in more detail below, the finer granularity of the mapping of logical addresses to physical addresses used by the address translation layer (e.g., FTL 21 in FIG. 1) can significantly reduce the amount of write amplification in NAND memory 114 and improve the write performance (e.g., in terms of write IOPS) of NAND memory 114 to allow NAND memory 114 to serve as a more cost-effective main memory than DRAM or SCM. In this regard, DRAM and several types of SCM may have a faster write speed and greater write endurance or durability than NAND memory, but DRAM and SCM generally cost more than NAND memory.

Figure 3:
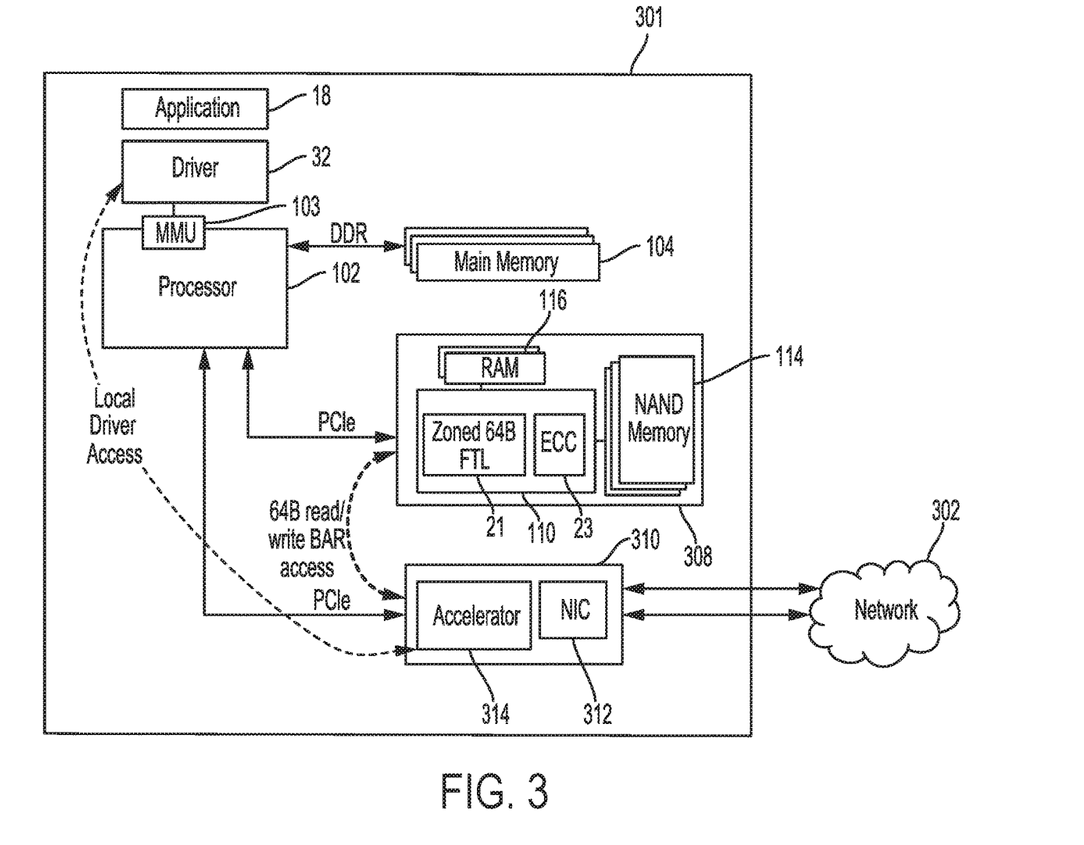
FIG. 3 is a block diagram of a server including a DSD according to an embodiment.
Figure 4:
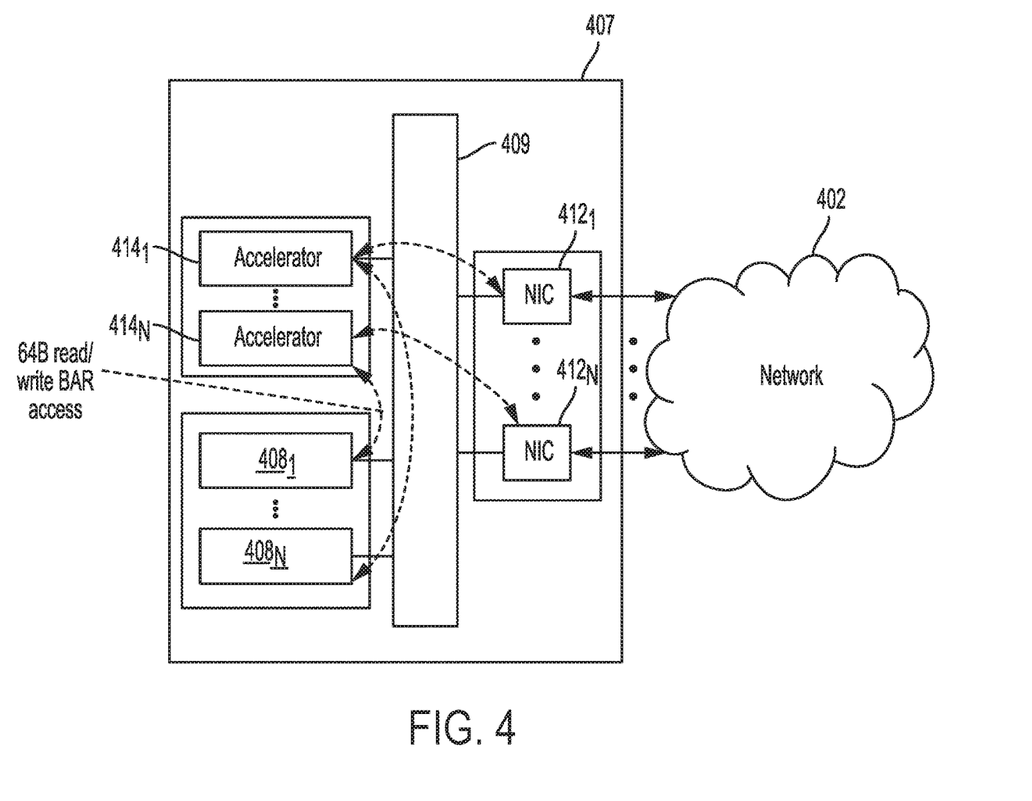
FIG. 4 is a block diagram of a storage device including multiple DSDs according to an embodiment.

Those of ordinary skill in the art will appreciate that other implementations may include a different arrangement of components or modules than those shown in FIG. 1. For example, other implementations may include multiple hosts and/or pools of DSDs with different types of storage media such as a combination of Solid-State Drives (SSDs) and Hard Disk Drives (HDDs) that may communicate via a network. For example, FIGS. 3 and 4 provide other implementations where the fine granularity address translation layer of the present disclosure is used in DSDs (e.g., DSD 308 in FIG. 3 and DSDs 408 in FIG. 4) that may form part of a server as in FIG. 3 or another type of networked storage device as in FIG. 4. In addition, those of ordinary skill in the art will appreciate that the fine granularity address translation layer of the present disclosure can be used with different types of non-volatile memory other than a NAND memory and that the address translation layer may therefore be referred to with a different name than an FTL.

Figure 2:
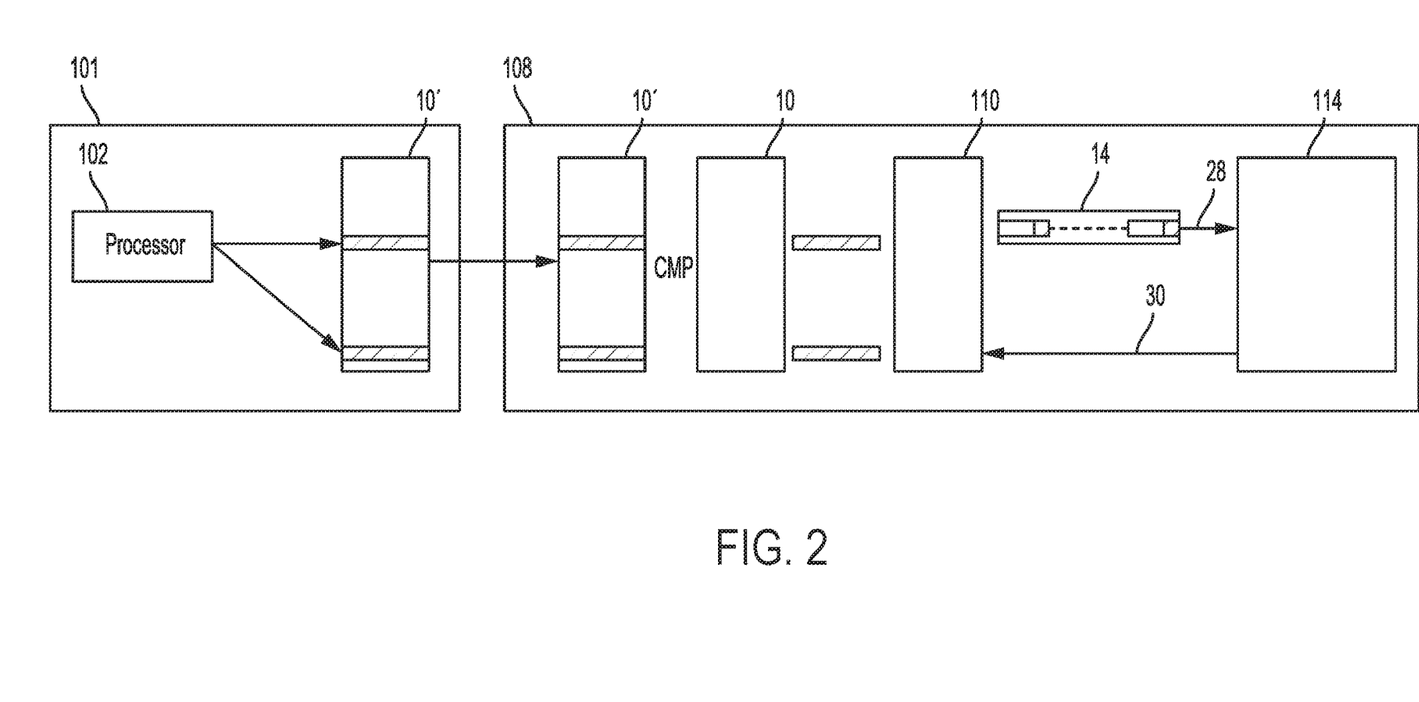
FIG. 2 illustrates an example of writing data in the DSD of FIG. 1 according to an embodiment.

FIG. 2 illustrates an example of writing data in DSD 108 according to an embodiment. As shown in FIG. 2, control circuitry 110 implements a delta write engine and the finer granularity of FTL 21. In the example of FIG. 2, two 64 Byte cache lines of 4K page 10' are modified (i.e., dirtied) at host 101 by processor 102, as indicated by the cross-hatched portions of page 10'. This page is eventually evicted to DSD 108 to make room for a new page to be loaded into a cache of processor 102.

In emerging DSDs capable of replacing DRAM (e.g., an Optane SSD), the entire 4K page would be rewritten into an SCM, which results in a write amplification of 10 to 30 times. This level of write amplification may be acceptable in operation due to a greater write endurance and lower write latency of the SCM as compared to NAND memory, but such SCMs generally cost much more than using a less expensive NAND memory.

In the implementation of FIG. 2, control circuitry 110 of DSD 108 uses a delta write engine and FTL 21 with a L2P mapping in 64 Byte blocks, as opposed to page-sized blocks of 4K, to reduce the write amplification and make using less expensive NAND memory 114 practicable for reducing the storage size needed for main memory 104 at host 101 or at other devices on a network. When page 10' is evicted, the corresponding previous version of page 10 stored in NAND memory 114 is read by control circuitry 110 and compared (indicated by "CMP" in FIG. 2) to evicted page 10' to identify any dirty, new, or modified data. Control circuitry 110 determines that only two 64 Byte cache lines out of the 4K page 10' have been modified or changed.

Only the two modified cache lines are written to NAND memory 114 in DSD 108 by using fine granularity FTL 21 that has an allocation size or allocation units that are significantly smaller than the typical allocation sizes of 4K, 8K or 16K in conventional DSDs using NAND memory. FTL 21 allocates physical storage units equal to or a single digit multiple of a cache line size of processor 102. The modified cache lines in the example of FIG. 2 are coalesced or buffered in buffer 24 with other dirty or new data to be written by DSD 108 into a 4K page in NAND memory 114 so that no valid or unmodified data from the evicted pages are rewritten, as would be the case in a conventional DSD with NAND memory.

Although the example of FIG. 2 uses an FTL granularity of 64 Bytes, other implementations may use a different allocation size of, for example, 32 Bytes or 128 Bytes. In some implementations, the allocation size for FTL 21 may be based on the size of a cache line of processor 102 of host 101 or typical cache line size of processors at hosts on a network (e.g., a size of an L1, L2, or L3 cache). For example, an allocation size of 32 Bytes may be used in implementations where a cache line size of processor 102 is 32 Bytes.

The finer granularity of the FTL in the present disclosure, however, uses more RAM (e.g., DRAM) for storing the larger L2P mapping(s) 22 resulting from the finer granularity. However, the cost of increase in RAM size needed for a 64 Byte FTL, for example, is still less expensive than using an SCM instead of NAND memory 114 in DSD 108. For example, a larger DRAM of 48 GB in a NAND SSD can store a finer granularity FTL for 2 Terabytes (TBs) of NAND storage that has an effective capacity of 1 TB due to overprovisioning of 1 TB for wear leveling and GC. Such a "1 TB" fast NAND SSD with the additional DRAM would still cost approximately less than half a 1 TB SSD using SCM instead of NAND. Greater cost savings are possible with less overprovisioning than 1:1. In addition, the reduction in write amplification significantly improves the write performance of such a fast NAND SSD (e.g., DSD 108 in FIG. 1) or a fast NAND module (e.g., DSDs 308 and 408 in FIGS. 3 and 4), since less write operations need to be performed when evicting or flushing a page to the fast NAND SSD or module of the present disclosure.

In other embodiments, the management of virtual memory on the host side can be modified so that main memory is accessed at a cache line level (e.g., 32 or 64 Byte access) as opposed to at a page level (e.g., as 4K or 8K pages). In such embodiments, only the dirty cache lines may be evicted from the main memory (e.g., from main memory 104 in FIGS. 1 and 3) to the fast NAND SSD or module so that it will be unnecessary for the fast NAND SSD or module to compare the old page to the evicted page to identify the dirty data within the evicted page, as in the example of FIG. 2. The delta write engine described above could then be omitted in such embodiments. In some implementations, a driver executed by host 101, such as DSD driver 16, formats write commands for storing data in NAND memory 114 at sizes matching the granularity of FTL 21.

FIG. 3 is a block diagram of server 301 including DSD 308 according to an embodiment. As shown in FIG. 3, one or more fast NAND SSD modules, such as DSD 308, can be shared on network 302 as part of a shared Memcached or Redis server, for example. In the example of FIG. 3, application 18 can include a Memcached or Redis application that works with driver 32 and Memory Management Unit (MMU) 103 of processor 102 to access data stored locally in DSD 308 and remotely at other servers or DSDs on network 302. Processor 102 executing application 18 and driver 32 in the example of FIG. 3 serve as a host with respect to DSD 308 for accessing data stored in NAND memory 114 of DSD 308. Processor 102 in the example of FIG. 3 uses MMU 103 to access main memory 104 via a Double Data Rate (DDR) interface or bus.

As shown in FIG. 3, control circuitry 110 of DSD 308 implements a 64 Byte granularity FTL 21 and Error Correcting Code (ECC) module for correcting data read from NAND memory 114. As will be appreciated by those of ordinary skill in the art, control circuitry 110 may perform other operations for NAND memory 114, such as overprovisioning, wear-leveling and GC. DSD 308 also includes RAM 116, which can be used by control circuitry 110 to implement FTL 21.

Network Interface Card (NIC) 312 is configured to allow server 301 to communicate on network 302 with other devices. NIC 312 is combined with hardware accelerator 314 in smart NIC 310. Hardware accelerator 314 can include, for example, one or more FPGAs or other circuitry that serves as a Memcached or Redis offload and a Transmission Control Protocol (TCP)/Internet Protocol (IP) offload to make main memory 104 and NAND memory 114 of DSD 308 visible for use by other servers or hosts on network 302.

In the example of FIG. 3, smart NIC 310, processor 102, and DSD 308 communicate on a PCIe bus of server 301 so that NAND memory 114 of DSD 308 is accessible by hardware accelerator 314 via a Base Address Register (BAR) used in the PCIe protocol. As shown in FIG. 3, this can allow for local access by driver 32 (e.g., a Memcached or Redis driver) of remote DSDs via smart NIC 310 or of DSD 308 in server 301. The use of DSD 308 with Memcached or Redis offloading can make server 301 significantly more cost effective due in part to the need for less DRAM in such shared Memcached or Redis servers.

FIG. 4 is a block diagram of storage device 407 including DSDs $408_1$ to $408_N$ according to an embodiment. Each of DSDs 408 can have a similar arrangement as DSD 308 in FIG. 3 in that each DSD 408 includes control circuitry 110 and NAND memory 114.

In the example of FIG. 4, storage device 407 includes internal PCIe fabric 409 that allows access to DSDs 408 in storage device 407 and to one or more devices (e.g., servers, DSDs, or other storage devices) on network 402 via NICs $412_1$ to $412_N$. Storage device 407 also includes hardware accelerators $414_1$ to $414_N$, which may include FPGAs or other circuitry for handling TCP/IP communications and Memcached, Redis or other application-specific processing that can access DSDs 408 using BARs on PCIe fabric 409. As compared to server 301 in FIG. 3, the compactness of DSDs 408 in storage device 407 in FIG. 4 without other components of server 307 in FIG. 3 (e.g., main memory 104 and processor 102) can allow for a denser appliance for a given amount of NAND memory to be used in place of DRAM or SCM. An arrangement of a storage device as in FIG. 4 can also provide a more cost-effective storage device due to the replacement of processor 102 of server 301 with hardware accelerators 414, and due to the elimination of DRAM or SCM outside of DSDs 408 in the storage device.

As discussed above, additional RAM may be used to support a finer FTL granularity in the DSDs of the present disclosure. However, as discussed in more detail below with reference to the zoning process of FIG. 8, the amount of RAM needed for the FTL can be reduced or partially offset by implementing special zoning in the NAND memory where the available storage capacity is divided into N zones, such as, for example, into 64 to 64,000 zones. In this zoning, each zone is treated as a miniature SSD having its own overprovisioning, GC, and zone block table to track valid counts and GC candidates. This can ordinarily allow for a shorter address to be used for each entry in the FTL resulting in a much smaller size of the FTL for a given number of entries. In one example, an address of 24 bits can be used for a zone of 512 MB, as opposed to using an address of 32 bits or 48 bits that would conventionally be used for a NAND memory without such zoning. This reduction in the size of the address becomes more important when providing a finer granularity of the FTL, which can increase the size or number of entries in the L2P mapping of the FTL.

The N zones may be wear leveled to allow for a more equal wear or use of the zones to improve the durability or usable life of the NAND memory in the DSDs of the present disclosure. In one example, a global erase block free pool and global wear leveling may be used among the zones. In another example, a front-end Logical Block Address (LBA) distributor may be used to help ensure a more equal distribution of traffic or data writes among the zones.

Example Processes

Figure 5:
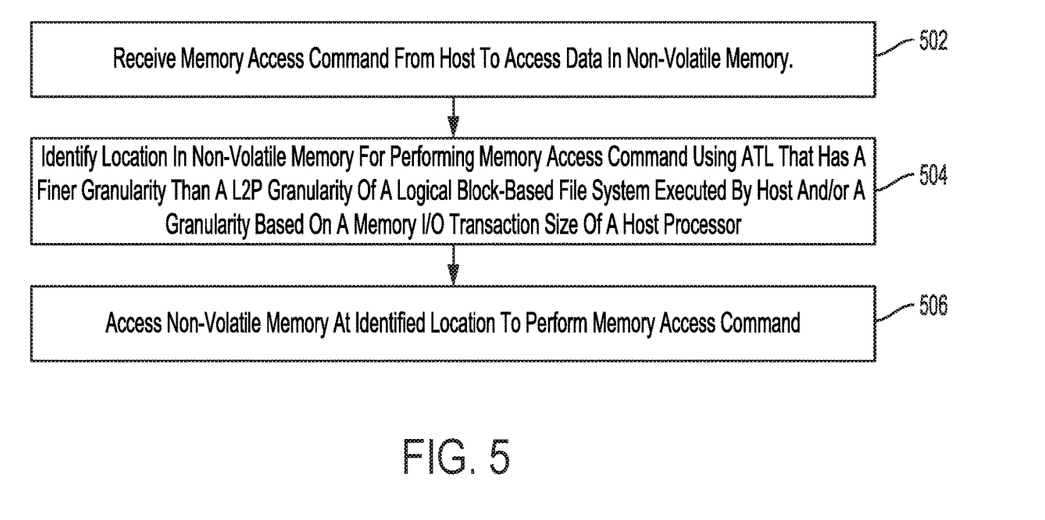
FIG. 5 is a flowchart for a memory access process according to an embodiment.

FIG. 5 is a flowchart for a memory access process according to an embodiment. The process of FIG. 5 can be performed by control circuitry of a DSD, such as control circuitry 110, executing a firmware of the DSD.

In block 502, the control circuitry receives a memory access command from a host, such as host 101 or from a remote host via a network, to access data in a non-volatile memory, such as NAND memory 114 in FIG. 1. The command can include a write command to write data or a read command to read data from the non-volatile memory. The command can include one or more logical addresses or a range of addresses indicating the data to be written or read.

In block 504, the control circuitry identifies a location in the non-volatile memory for performing the memory access command using an Address Translation Layer (ATL) including a L2P mapping that has a finer granularity than a L2P granularity of a logical block-based file system executed by the host and/or a granularity based on a memory I/O transaction size of a host processor, as opposed to a storage I/O transaction size based on a page size. In some implementations, the granularity or allocation size of the ATL (e.g., FTL 21 in FIG. 1) is equal to or a single digit multiple of a cache line size of a processor of the host (e.g., processor 102 in FIGS. 1 and 3). As discussed above, such I/O transaction sizes of a cache line size or a low single digital multiple of the cache line size (i.e., two or three times the cache line size) are typically the most common transaction sizes for a processor of a host.

In block 506, control circuitry 110 accesses the non-volatile memory (e.g., NAND memory 114 in FIG. 1) at the location or locations identified in block 504 to perform the memory access command. For write commands, the data may be buffered in buffer 24 until reaching a page size of the non-volatile memory before writing the data to the identified location. A write complete indication may then be sent to the host that issued the write command. For read commands, control circuitry 110 returns the requested data to the host.

Figure 6A:
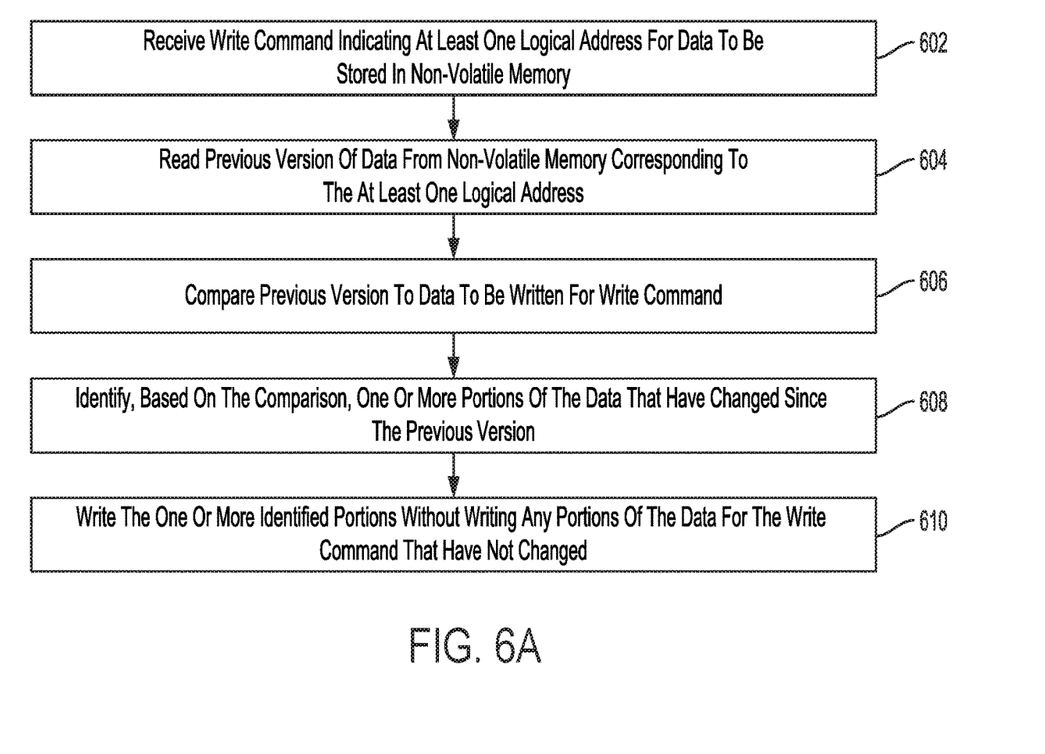
FIG. 6A is a flowchart for a write process according to an embodiment.

FIG. 6A is a flowchart for a write process according to an embodiment where a comparison is performed by the DSD to determine which data has changed since a previous version of the data stored in a non-volatile memory (e.g., NAND memory 114 in FIG. 1). The process of FIG. 6A can be performed by control circuitry of a DSD, such as control circuitry 110, executing a firmware of the DSD.

In block 602, a write command is received indicating at least one logical address for data to be stored in the non-volatile memory. The logical address can include a range of logical addresses, such as with a beginning address and a run length or with beginning and ending logical addresses.

In block 604, the control circuitry reads a previous version of the data from the non-volatile memory corresponding to the at least one logical address for the command. The previous version can include a page stored in the non-volatile memory that is indicated by one or more logical addresses for the command.

In block 606, the control circuitry compares the previous version of the data to the data to be written for the command. In some implementations, the previous version of the data and the data to be written may be temporarily stored in a buffer of RAM 116, such as in buffer 24.

In block 608, the control circuitry identifies one or more portions of the data that have changed since the previous version. With reference to the example of FIG. 2 discussed above, the changed portions would include the modified or dirty cache lines shown by the cross-hatching in page 10'. In other examples, the changed portions may be new data for a logical address or addresses that have not been previously stored in the non-volatile memory. In such examples, the control circuitry may determine in block 614 upon accessing L2P mapping(s) of an ATL (e.g., L2P mappings 22 of FTL 21) to identify a location for the previous version that the logical address or addresses for the command have not been written to yet. In such an example, the new data or data for the logical address or addresses that have not been previously written would be identified in block 608 as data that has changed from a previous version. In other implementations, the control circuitry may still access the non-volatile memory for the previous version even if the logical addresses have not been previously written.

In block 610, the one or more portions of the data identified in block 608 are written to the non-volatile memory without writing any portions of the data for the write command that have not changed. The use of a finer granularity or smaller allocation size in the ATL allows for the comparison of data within an evicted page to identify the changed portions of the evicted page. This ordinarily reduces the amount of write amplification, since all of the data written in the non-volatile memory for host write commands is only new or modified data, as opposed to rewriting valid data within an evicted page that is not new or modified.

Figure 6B:
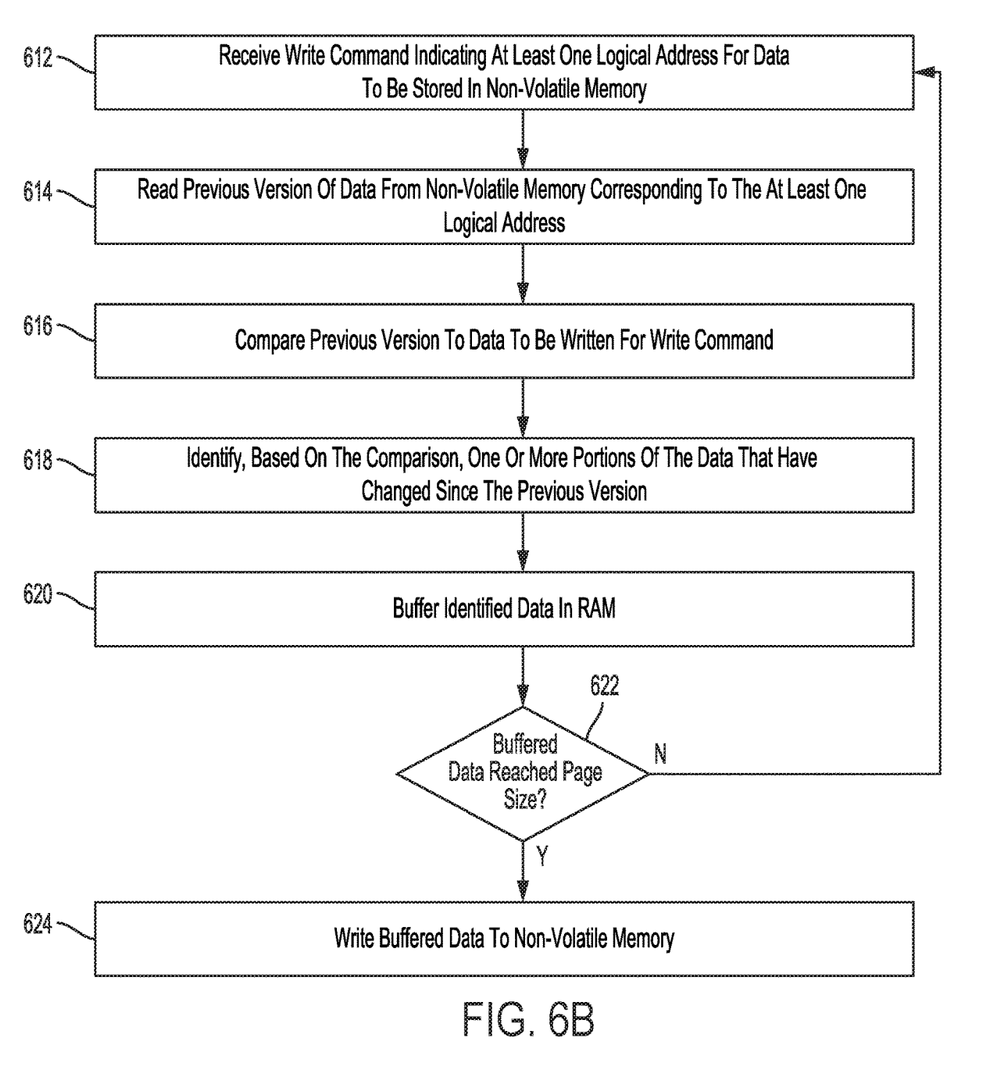
FIG. 6B is a flowchart for a write process with page size buffering according to an embodiment.

FIG. 6B is a flowchart for a write process with page size buffering according to an embodiment. As with the write process of FIG. 6A, the write process of FIG. 6B can be performed by control circuitry of a DSD, such as control circuitry 110, executing a firmware of the DSD. The description of blocks 612 to 618 in FIG. 6B corresponds to the above description of blocks 602 to 608 for FIG. 6A, so this description is not repeated below. The write process of FIG. 6B differs from the write process of FIG. 6A in that the new or changed data is buffered until reaching a page size of the non-volatile memory before writing the data in the non-volatile memory, as in the example of FIG. 2 discussed above.

In block 620 of FIG. 6B, the changed or new data identified in block 618 is buffered in buffer 24 of RAM 116. It is determined in block 622 whether the buffered data has reached a page size or smallest writable unit of the non-volatile memory (e.g., NAND memory 114), such as a 4K, 8K, or 16K page size. If so, the buffered data is written to the non-volatile memory in block 624.

If it is determined in block 622 that the buffered data has not reached the page size, the process returns to block 612 to wait to receive an additional write command for writing data in the non-volatile memory. Data for additional write commands is added to buffer 24 until reaching the page size, and then the buffered data is written in the non-volatile memory. In some implementations, the data buffered in buffer 24 may include data to be written for internal commands, such as for maintenance operations (e.g., GC or data refreshing), as opposed to only including data for host write commands.

Figure 7:
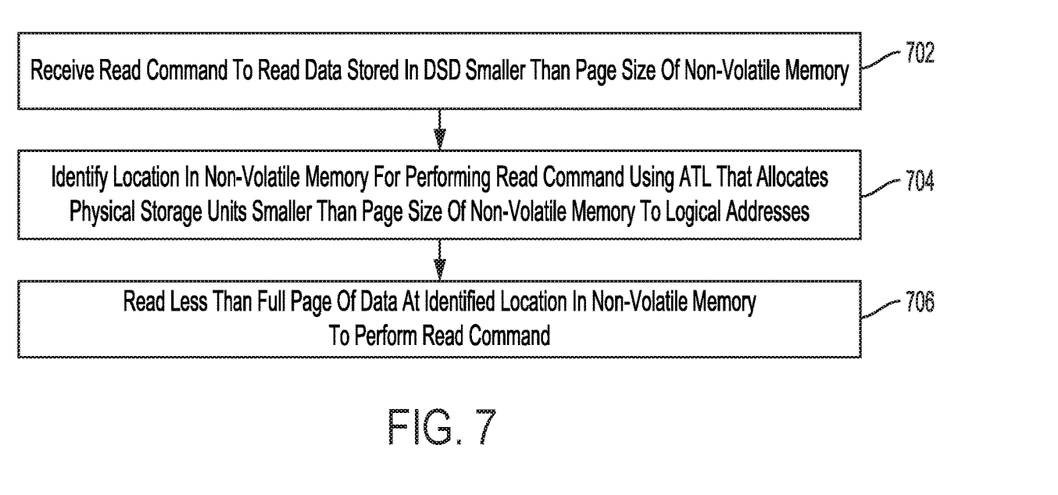
FIG. 7 is a flowchart for read process according to an embodiment.

FIG. 7 is a flowchart for read process according to an embodiment. The read process of FIG. 7 can be performed by control circuitry of a DSD, such as control circuitry 110, executing a firmware of the DSD.

In block 702, a read command is received to read data stored in the non-volatile memory (e.g., NAND memory 114) that is smaller than a page size of NAND memory 114 (e.g., smaller than a 4K page size). As noted above, this page size can correspond to a storage capacity of a smallest writable unit of the non-volatile memory (e.g., pages 26 in FIG. 1).

In block 704, the control circuitry identifies a location or locations in the non-volatile memory using an ATL to perform the read command. As discussed above, the L2P mapping of FTL 21 (e.g., L2P mappings 22 in FIG. 1) allocates physical storage units that are smaller than the page size of NAND memory 114 to logical addresses. The granularity or allocation size of FTL 21 can be based on a typical memory I/O transaction size of processors of hosts that access the DSD that includes the non-volatile memory. In some implementations, this granularity or allocation size can be, for example, 32 Bytes, 64 Bytes, or 128 Bytes.

In block 706, the control circuitry reads less than the full page of data at the identified location or locations in the non-volatile memory. The read data may be buffered in RAM 116 before sending the requested data back to the host. The use of a finer granularity ATL for the non-volatile memory ordinarily improves the read performance of the system including the DSD and the host. In more detail, less processing is ordinarily needed by the host to identify data within a returned page of data, since only the requested data is returned to the host, as opposed to a full page of data that includes a portion within the page that is needed by the host. In addition, less data is transferred from the DSD to the host or processor, which reduces the overall amount of data traffic on a network or on a local bus within a server, such as in server 301 in FIG. 3.

Figure 8:
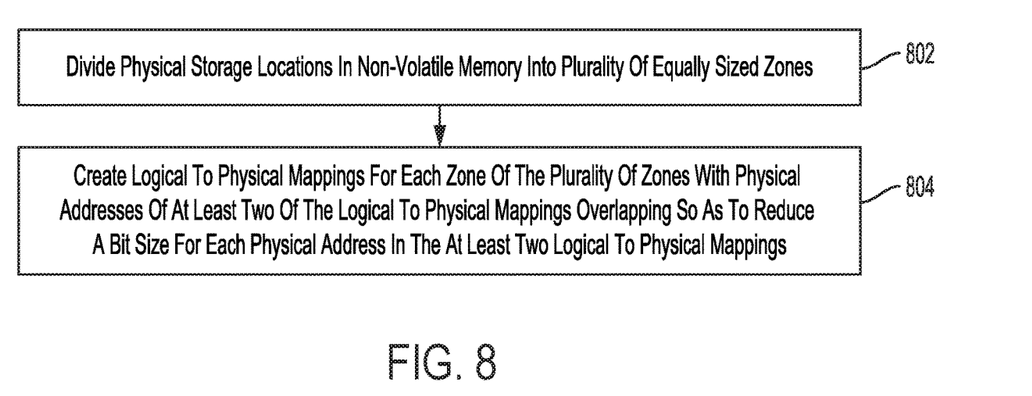
FIG. 8 is a flowchart for a memory zoning process according to an embodiment.

FIG. 8 is a flowchart for a memory zoning process according to an embodiment. The zoning process of FIG. 8 can be performed by control circuitry of a DSD, such as control circuitry 110, executing a firmware of the DSD. In other implementations, the zoning process of FIG. 8 may be performed by a configuration device or host external to the DSD for configuring the DSD before use in the field. In this regard, the zoning process of FIG. 8 may be performed as part of an initialization process at the factory or as part of an initial startup in the field. As discussed above, dividing the non-volatile memory (e.g., NAND memory 114) into equally sized zones with logical to physical mappings that overlap can allow for a smaller address to be used, which in turn, decreases the amount of RAM needed to store L2P mapping(s) in the DSD. This reduction in address size helps to partially offset the increased amount of RAM used for L2P mapping(s) that have a finer granularity.

In block 802, the physical storage locations in the non-volatile memory are divided into a plurality of equally sized zones. For example, NAND memory 114 can be divided into hundreds or thousands of equally sized zones. As noted above, each zone is treated as a miniature SSD having its own overprovisioning, GC, and zone block table to track valid counts and GC candidates. In one example, an address of 24 bits can be used for a zone of 512 MB, as opposed to using an address of 32 bits or 48 bits that would conventionally be used for addressing physical NAND memory locations.

In block 804, L2P mappings (e.g., L2P mappings 22 in FIG. 1) are created for each zone of the plurality of zones with physical addresses of at least two of the L2P mappings overlapping so as to reduce a bit size for each physical address in the at least two L2P mappings. The physical addresses overlap in that at least two of the L2P mappings include the same physical addresses. In operation, the control circuitry of the DSD uses a mapping to determine the zone where data is to be accessed. However, this initial or higher-level mapping used to identify a zone still consumes significantly less space in RAM 116 than the millions of additional physical addresses or entries that would otherwise be needed in most cases to implement a L2P mapping having a granularity or allocation unit size of only 32 or 64 Bytes within an overall storage capacity for the non-volatile memory of several TBs, for example.

Figure 9:
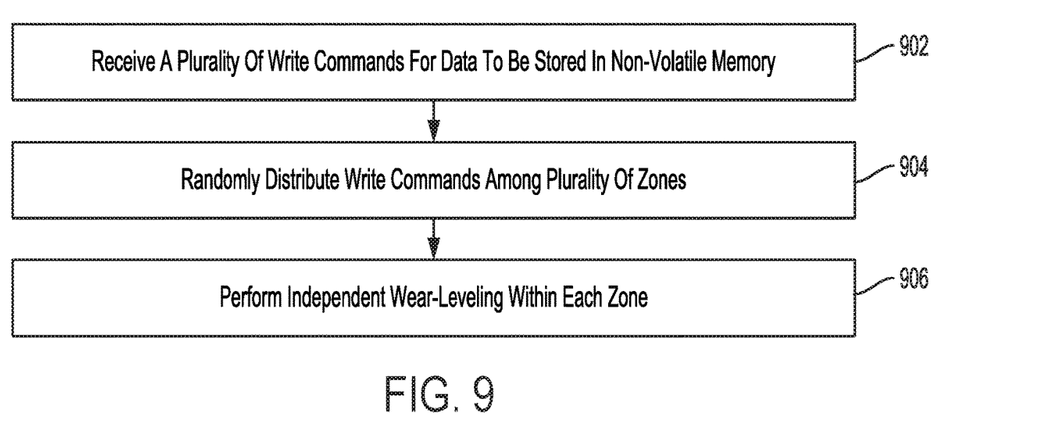
FIG. 9 is a flowchart for a write distribution process according to an embodiment.

FIG. 9 is a flowchart for a write distribution process according to an embodiment. The write distribution process of FIG. 9 can be performed by control circuitry of a DSD, such as control circuitry 110, executing a firmware of the DSD.

In block 902, the control circuitry receives a plurality of write commands for data to be stored in the non-volatile memory. In block 904, the control circuitry randomly distributes the write commands among a plurality of equally sized zones, such as the zones created in the zoning process of FIG. 8. In some implementations, the write commands can be randomly distributed by using a front-end LBA distributor. For example, control circuitry may use a portion of the logical address and a hash table to indicate a zone and a physical address within the zone for accessing data.

In block 906, the control circuitry performs independent wear leveling within each zone. Each zone may have its own L2P mapping 22 for indirection at the zone level, so that writes can be more evenly occur across the different blocks within the zone to extend the usable life of the non-volatile memory.

As discussed above, the foregoing use of a finer granularity address translation layer for a non-volatile memory ordinarily allows for improved performance and less write amplification since unmodified data does not need to be rewritten. In addition, the foregoing zoning of the non-volatile memory ordinarily allows for a reduced address size, which offsets some of the increased memory capacity used for a finer granularity address translation layer.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a MPU, a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or control circuitry may also be implemented as a combination of computing devices, e.g., a combination of a DSP and an MPU, a plurality of MPUs, one or more MPUs in conjunction with a DSP core, or any other such configuration. In some implementations, the control circuitry or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
a non-volatile memory configured to store data; and
control circuitry configured to:
receive a memory access command from a host to access data in the non-volatile memory;
identify a location in the non-volatile memory for performing the memory access command using an Address Translation Layer (ATL) that has a finer logical-to-physical granularity than a logical-to-physical granularity of a logical block-based file system executed by the host; and
access the non-volatile memory at the identified location to perform the memory access command.

2. The DSD of claim 1, wherein the memory access command is a write command indicating at least one logical address for data to be stored in the DSD, and wherein the control circuitry is further configured to:
read a previous version of the data from the non-volatile memory corresponding to the at least one logical address;
compare the previous version of the data to the data to be written for the write command;
identify one or more portions of the data to be written that have changed since the previous version of the data; and
write the one or more portions of the data that have changed to the non-volatile memory without writing any portions of the data for the write command that have not changed.

3. The DSD of claim 2, wherein the DSD further comprises a Random Access Memory (RAM), and wherein the control circuitry is further configured to:
buffer data in the RAM identified as portions of data to be written that have changed since previous versions of data to be written for performing write commands; and
write the buffered data to the non-volatile memory in response to the buffered data reaching a page size of the non-volatile memory.

4. The DSD of claim 1, wherein the ATL allocates physical storage units equal to or a single digit multiple of a cache line size of a processor of the host.

5. The DSD of claim 1, wherein the host executes a driver that formats write commands for storing data in the DSD at sizes matching the ATL granularity.

6. The DSD of claim 1, wherein the memory access command is a read command to read data stored in the DSD that is smaller than a page size of the non-volatile memory, and wherein the control circuitry is further configured to read less than a full page of data from the non-volatile memory using the ATL to perform the read command.

7. The DSD of claim 1, wherein the control circuitry is further configured to:
divide the physical storage locations in the non-volatile memory into a plurality of equally sized zones; and
create logical-to-physical mappings for each zone of the plurality of zones, wherein the physical addresses of at least two logical-to-physical mappings overlap so as to reduce a bit size used for each physical address in the at least two logical-to-physical mappings.

8. The DSD of claim 7, wherein the control circuitry is further configured to perform independent wear-leveling within each zone of the plurality of zones.

9. The DSD of claim 7, wherein the control circuitry is further configured to randomly distribute write commands among the plurality of zones.

10. A method for operating a Data Storage Device (DSD), the method comprising:
receiving a memory access command from a host to access data in a NAND memory of the DSD;
identifying a location in the NAND memory for performing the memory access command using a Flash Translation Layer (FTL) that has a granularity based on a main memory Input/Output (TO) transaction size of a processor of the host; and
accessing the NAND memory at the identified location to perform the memory access command.

11. The method of claim 10, wherein the memory access command is a write command indicating at least one logical address for data to be stored in the DSD, and wherein the method further comprises:
reading a previous version of the data from the NAND memory corresponding to the at least one logical address;
comparing the previous version of the data to the data to be written for the write command;
identifying one or more portions of the data to be written that have changed since the previous version of the data; and
writing the one or more portions of the data that have changed to the NAND memory without writing any portions of the data for the write command that have not changed.

12. The method of claim 11, wherein the DSD further comprises a Random Access Memory (RAM), and wherein the method further comprises:
buffering data in the RAM identified as portions of data to be written that have changed since previous versions of data to be written for performing write commands; and writing the buffered data to the NAND memory in response to the buffered data reaching a page size of the NAND memory.

13. The method of claim 10, wherein the granularity of the FTL is equal to or a single digit multiple of a cache line size of a processor of the host.

14. The method of claim 10, wherein the host executes a driver that formats write commands for storing data in the DSD at sizes matching the cache line size of a processor of the host.

15. The method of claim 10, wherein the memory access command is a read command to read data stored in the DSD that is smaller than a page size of the NAND memory, and wherein the method further comprises reading less than a full page of data from the NAND memory using the FTL to perform the read command.

16. The method of claim 10, further comprising:
dividing the physical storage locations in the NAND memory into a plurality of equally sized zones; and
creating logical-to-physical mappings for each zone of the plurality of zones, wherein the physical addresses of at least two logical-to-physical mappings overlap so as to reduce a bit size used for each physical address in the at least two logical-to-physical mappings.

17. The method of claim 16, further comprising performing independent wear-leveling within each zone of the plurality of zones.

18. The method of claim 16, further comprising randomly distributing write commands among the plurality of zones.

19. A non-transitory computer readable medium storing computer-executable instructions, wherein when the computer-executable instructions are executed by control circuitry of a Data Storage Device (DSD) including a NAND memory, the computer- executable instructions cause the control circuitry to:
receive a memory access command from a host to access data in the NAND memory;
identify a location in the NAND memory for performing the memory access command using a Flash Translation Layer (FTL) that has a finer logical-to-physical granularity than a logical-to-physical granularity of a logical block-based file system executed by the host; and
access the NAND memory at the identified location to perform the memory access command.

20. The non-transitory computer readable medium of claim 19, wherein the memory access command is a write command indicating at least one logical address for data to be stored in the DSD, and wherein when the computer-executable instructions are executed by the control circuitry, the computer-executable instructions further cause the control circuitry to:
read a previous version of the data from the NAND memory corresponding to the at least one logical address;
compare the previous version of the data to the data to be written for the write command;
identify one or more portions of the data to be written that have changed since the previous version of the data; and
write the one or more portions of the data that have changed to the NAND memory without writing any portions of the data for the write command that have not changed.

21. The non-transitory computer readable medium of claim 19, wherein when the computer-executable instructions are executed by the control circuitry, the computer-executable instructions further cause the control circuitry to:
divide the physical storage locations in the NAND memory into a plurality of equally sized zones; and
create logical-to-physical mappings for each zone of the plurality of zones, wherein the physical addresses of at least two logical-to-physical mappings overlap so as to reduce a bit size used for each physical address in the at least two logical-to-physical mappings.

* * * * *